United States Patent [19]
Kuhn et al.

[11] Patent Number: 5,012,632
[45] Date of Patent: May 7, 1991

[54] BELT TENSIONER

[75] Inventors: John B. Kuhn, Rubicon; Kenneth E. Hunt, Oconomowoc; Christopher S. Thorman, Beaver Dam, all of Wis.

[73] Assignee: Deere & Company, Moline, Ill.

[21] Appl. No.: 488,197

[22] Filed: Mar. 5, 1990

[51] Int. Cl.$^5$ .................. A01D 69/08; F16H 7/08
[52] U.S. Cl. .................. 56/11.6; 56/DIG. 22; 474/84; 474/135
[58] Field of Search ............ 56/10.6, 11.6, 10.8, 56/13.5, 13.6, 15.3, 229, 255, 320.1, DIG. 22, 6; 474/101, 113, 84–89, 117, 119, 133, 135

[56] References Cited

U.S. PATENT DOCUMENTS

| | | | |
|---|---|---|---|
| 3,525,269 | 8/1970 | Peters | 474/89 |
| 3,613,462 | 10/1971 | Stibbe | 474/89 X |
| 4,068,452 | 1/1978 | Schaefer et al. | 56/11.6 |
| 4,231,215 | 11/1980 | Klas | 56/11.6 |
| 4,400,930 | 8/1983 | Huhman et al. | 56/11.6 |
| 4,498,889 | 2/1985 | Stevens et al. | 474/133 |
| 4,511,348 | 4/1985 | Witdoek et al. | 474/109 |
| 4,813,215 | 3/1989 | Chase et al. | 56/11.6 |

OTHER PUBLICATIONS

John Deere Horicon Works; Title: 170, 175, 180 and 185 Lawn Series Operator's Manual; 1988; pp. 55, 56, 60 and 61.
John Deere Horicon Works; Title: RX63, RX73, RX75, RX95, SX75 and SX95 Riding Mowers Operator's Manual; 1989, pp.: Inside fron cover, 22 and 52.
J. I. Case Company; The MOD 80 Rider from Case; 1977, pp. 1–6.
Ariens Company; Ariens Rider Mowers: A Cut Above the Rest; 1967; pp. 1–6.

Primary Examiner—Ramon S. Britts
Assistant Examiner—David J. Bagnell

[57] ABSTRACT

A mower having a belt tensioner that includes a belt engaging primary pulley swingably supported by a primary arm. A rod coupled to the arm carries a spring that acts to push the pulley into engagement with the belt. The rod acts to pull the pulley away from the belt to release the tension in the belt for removal of the belt. A handle attached to the rod is turned by the operator to positively swing the pulley away from the belt. The handle may also be gripped by the operator's hand to lift that portion of the deck during operation to avoid gouging irregular ground conditions or striking obstructions.

29 Claims, 4 Drawing Sheets

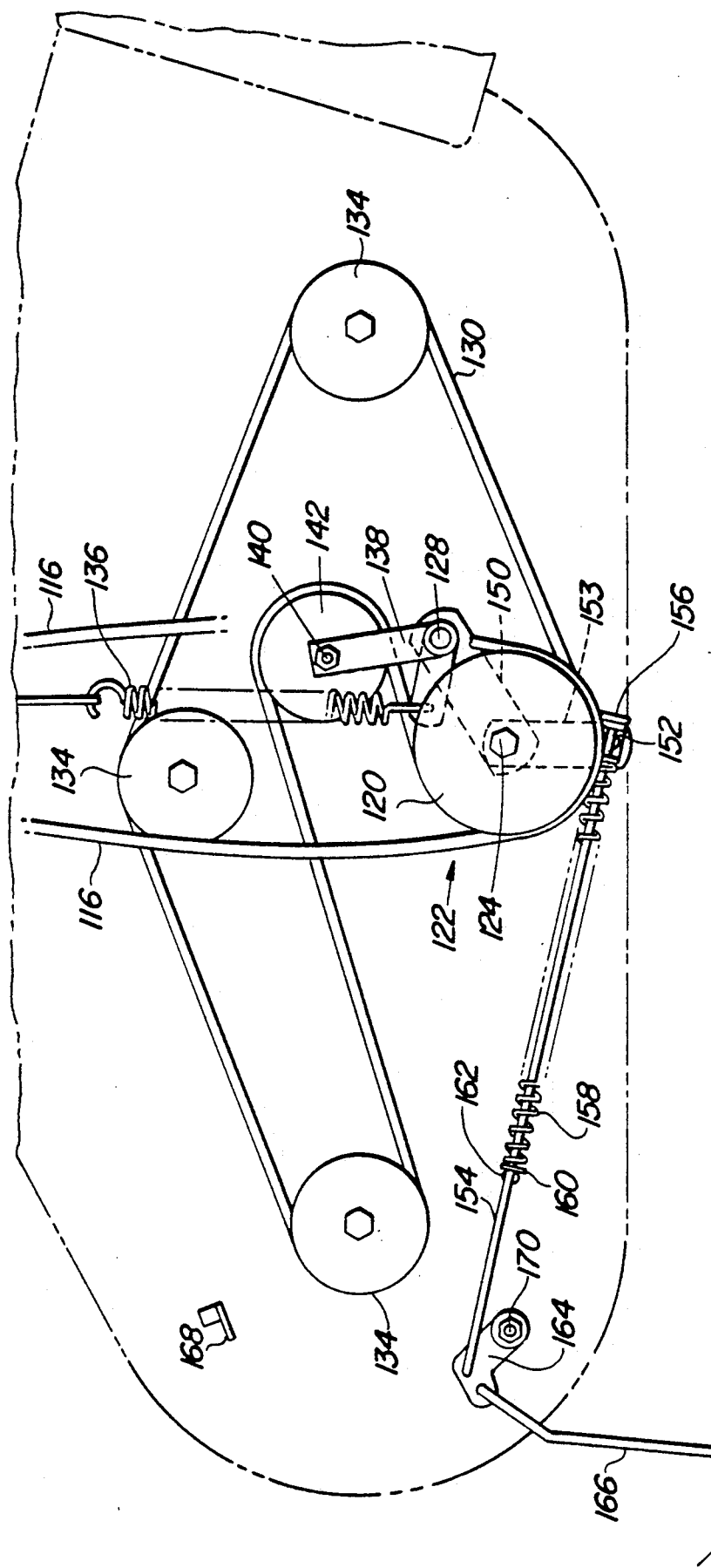

BELT TENSIONER

BACKGROUND OF THE INVENTION

1. Field of the Invention

The invention relates to a mechanism for tensioning a belt that transmits power from a power source to cutter blades on a mowing vehicle.

2. Description of the Related Art

Many conventional mowing vehicles provide a mower deck within which blades rotate to cut vegetation. The blades are driven by a belt or series of belts coupled with a power source. These mowers provide mechanisms for tensioning the belt or belts in order to keep them tightly engaged with pulleys coupled to the blades. The tensioners act to compensate for stretching and wear that can occur in the belt over time. Many mower decks roll over the ground surface independent of the vehicle or tractor, such that the tensioners also act to maintain working tension in the belts as the deck moves relative to the vehicle. Many tensioners include a tension spring coupled with a swingable pulley upon which the belt rides. The tension spring pulls the pulley into the belt, thereby placing the belt under tension. The tension in the belt can be released by releasing the tension spring such that the belt can be changed or the mower deck removed. Many mowers do not allow an operator to positively displace the tensioner pulley to facilitate removal of the belt. When the operator pulls the spring to tension the belt he must do a large amount of work to tension the spring to the desired amount.

Many mowers provide two belts: a primary and a secondary belt. The primary belt couples the implement with the power source of the vehicle and has a tension spring and pulley in engagement with the belt. The secondary belt is engaged with the mower blades via a series of secondary pulleys and is also placed under tension by a tensioner pulley and tension spring. One of these secondary pulleys is fixed for rotation with the same shaft as the primary belt's tensioner pulley in order to transmit power from the primary belt to the secondary belt. When an operator releases the primary belt tensioner spring to remove the primary belt, the secondary belt tensioner spring remains engaged. Since the two belts are coupled together by the swingable common shaft of the two pulleys, any tensioning of the secondary belt acts to tension the primary belt even when the primary belt tensioner is released. In order for the operator to remove the primary belt he releases the primary belt tensioner and further pushes the primary pulley by hand to a point where the primary belt becomes slack enough to remove from its pulleys. This may be difficult and awkward due to the position of the primary pulley beneath the vehicle or tractor.

It is known to provide mower decks with handles that can be grabbed by the operator during operation such that the deck can be lifted over ground obstructions without halting mowing operations. These handles are ordinarily welded or otherwise fixed to the deck, which raises the cost to manufacture the deck.

SUMMARY OF THE INVENTION

It would be desirable to provide a mower with a belt driven cutting device having a mechanism for tensioning the belt that is also capable of positively removing the tension from the belt. It would also be desirable to provide a mower that can be placed in the belt tensioned mode with a small amount of effort on the part of the operator. Further, it would be desirable to include within such a mechanism a handle on the mower deck that can be grabbed by the hand of the operator when he wishes to lift a portion of the deck.

The present invention provides a belt tensioner that includes a belt engaging primary pulley swingably supported by a primary arm. A rod coupled to the arm carries a spring that acts to push the pulley into engagement with the belt. The rod acts to pull the pulley away from the belt to release the tension in the belt for removal of the belt. A handle attached to the rod can be turned by the operator to positively swing the pulley away from the belt. The handle may also be gripped by the operator's hand to lift that portion of the deck during operation to avoid gouging irregular ground conditions or striking obstructions.

BRIEF DESCRIPTION OF THE DRAWINGS

FIG. 3 is a partial view of the present invention with the primary belt tensioning mechanism released.

DESCRIPTION OF THE PREFERRED EMBODIMENT

Figure 5:
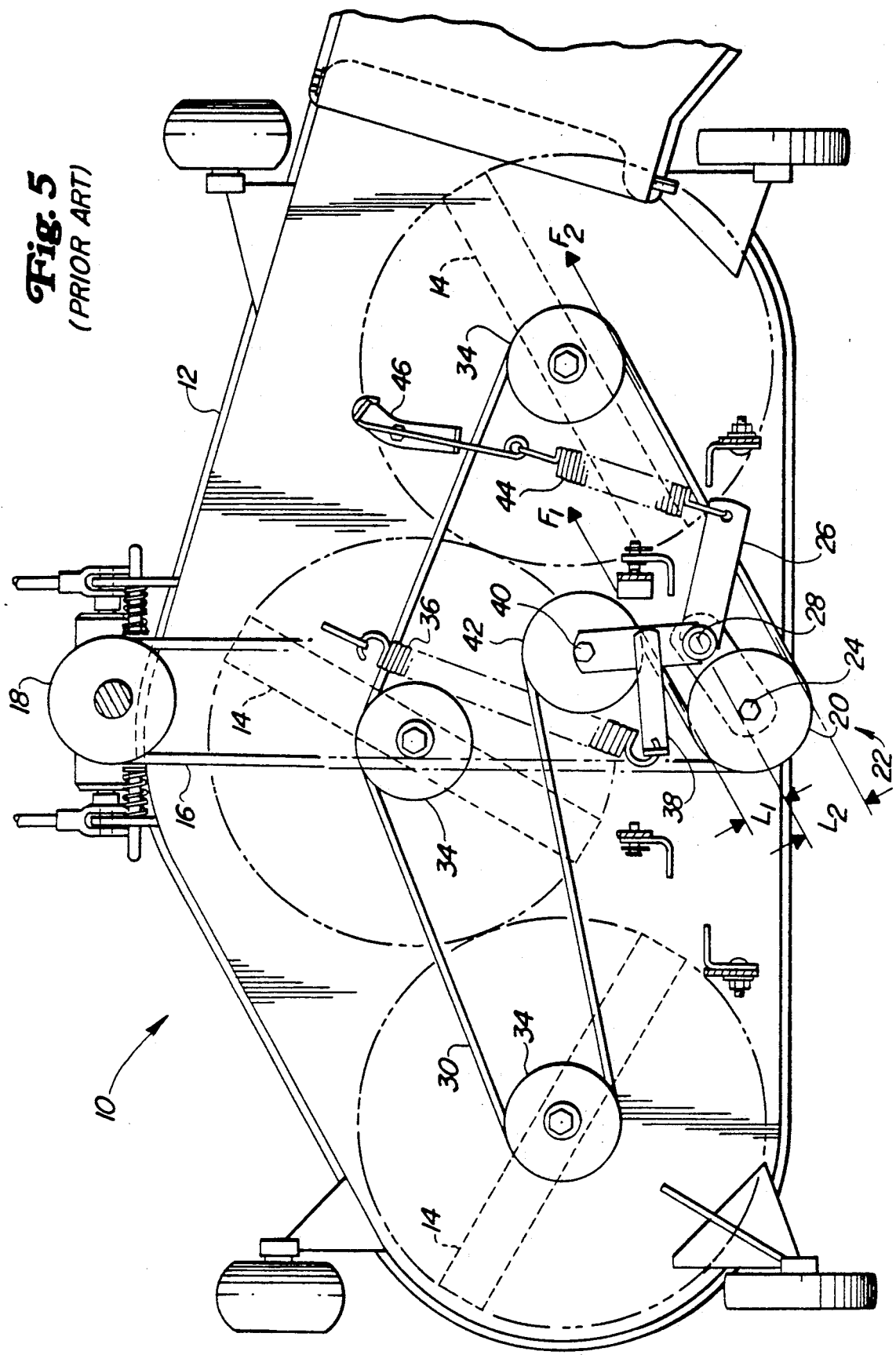
FIG. 5 shows a prior art belt tensioning device when the belts are being tensioned.

Before describing the preferred embodiment of the present invention, a belt tensioning mechanism in the prior art will be discussed in more detail. Referring now to FIG. 5, there is shown a conventional mowing device 10 carried by a tractor or other powered vehicle. A mower deck 12 is provided within which blades 14 rotate to cut vegetation.

A mechanism is provided by this conventional mower for transmitting power from the power source to the blades within the deck. That mechanism includes a primary belt 16 coupled with the power source output sheave 18. The belt 16 is entrained upon a primary pulley 20 of a double pulley jacksheave 22. The primary pulley 20 is fixed for rotation with a tube or shaft 24 carried by a primary arm member 26. The primary arm member 26 is pivotably fixed by a pivot shaft 28 to the deck 12.

This conventional mower provides a mechanism for transmitting power from the primary belt 16 to the blades 14. The mechanism includes a secondary belt 30 entrained about a secondary pulley 32 of the double pulley jacksheave 22. Since the secondary pulley 32 is directly below primary pulley 20, it is not visible in the view of FIG. 5. The secondary pulley 32 is fixed for rotation with the same shaft 24 as the primary pulley 20. The secondary belt 30 also engages blade pulleys 34 that are coupled with the mower blades 14.

A mechanism for tensioning the secondary belt 30 is provided that includes a secondary tension spring 36 coupled between the deck 12 and a secondary arm member 38. The secondary arm member 38 pivots about the pivot shaft 28, and is not fixed for rotation with the primary arm member 26. The primary arm member 26 and the secondary arm member 38 are separate parts and therefore pivot independent of one another on the pivot shaft 28. The secondary arm member 38 carries a shaft 40 about which a secondary tensioner pulley 42 rotates in contact with the secondary belt 30. The tension in the spring 36 acts to pivot the secondary arm member 38 such that the tensioner pulley 42 is forced into the secondary belt 30. Tension is thereby placed on the secondary belt 30 to keep it drivingly engaged with the pulleys 32, 34, and 42.

A device is also provided that places tension in the primary belt 16 that includes a primary spring 44 extending between the primary arm member 26 and a swingable latch handle 46 carried on the deck 12. When the latch 46 is engaged, as shown in FIG. 5, the primary spring 44 is in tension such that the primary arm 26 pivots counterclockwise about the pivot shaft 28. This forces the primary pulley 20 to shift counterclockwise and rearwardly into the primary belt 16 to keep the primary belt 16 drivingly coupled with the primary pulley 20 and power source output sheave 18. When the latch 46 is released the primary spring 44 is not under tension and the primary pulley 20 is not being forced by the primary spring 44 into the primary belt 16. However, the secondary spring 36 and secondary belt 30 remain tightened. The tension in the secondary belt acts to swing the secondary jacksheave pulley 32 counterclockwise about the pivot shaft 28. The primary pulley 20 that is fixed with the secondary pulley 32 for pivoting about the pivot shaft 28 is thereby caused to swing counterclockwise and rearwardly into the primary belt 16. As the tension spring 36 swings the secondary tensioner pulley 42 clockwise, the belt 30 is tensioned and it in turn applies equal forces F1 and F2 to the jacksheave 22. These forces F1 and F2 are applied at distances L1 and L2 from the shaft 28. Since L2 is greater than L1, the moment created by F1L1 is smaller than the moment created by F2L2. Accordingly, the belt 30 acts to urge the jacksheave 22 counterclockwise about the pivot shaft 28 and maintain the primary belt 16 in a tightened configuration. Therefore, the tension in the secondary spring 36 acts to tension the primary belt 16 even when the primary tensioner mechanism is released. When an operator wishes to remove the primary belt 16 for removal of the deck 12, the primary belt 16 does not become entirely slack simply by the release of the primary belt tensioner. In order to disengage the primary belt 16 from the primary pulley 20 the operator might positively shift the primary pulley 20 forward with his hand. This may be difficult and awkward due to the position of the primary pulley 20 beneath the vehicle or tractor.

Figure 1:
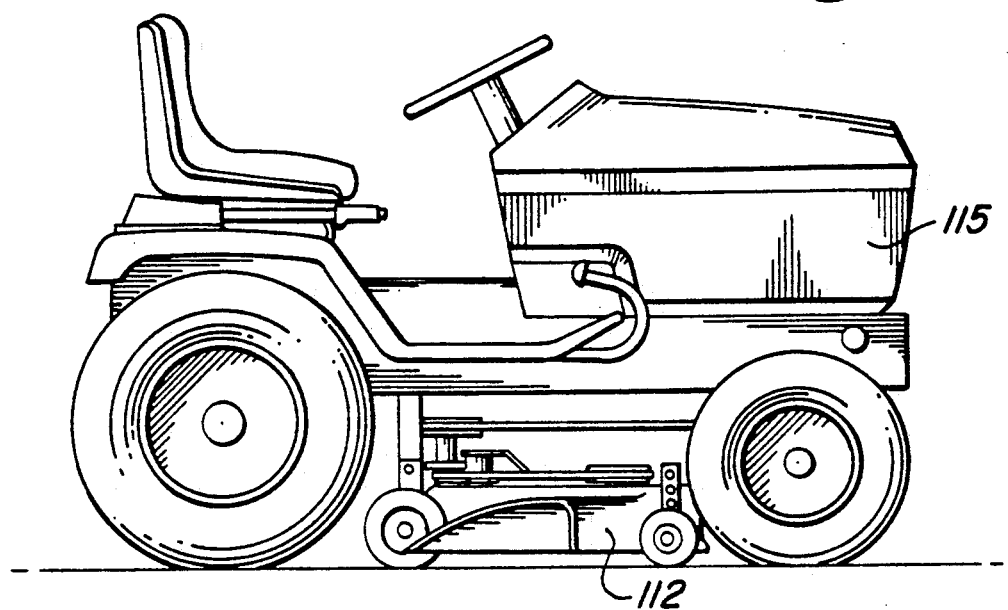
FIG. 1 shows a mowing vehicle carrying the present invention.
Figure 4:
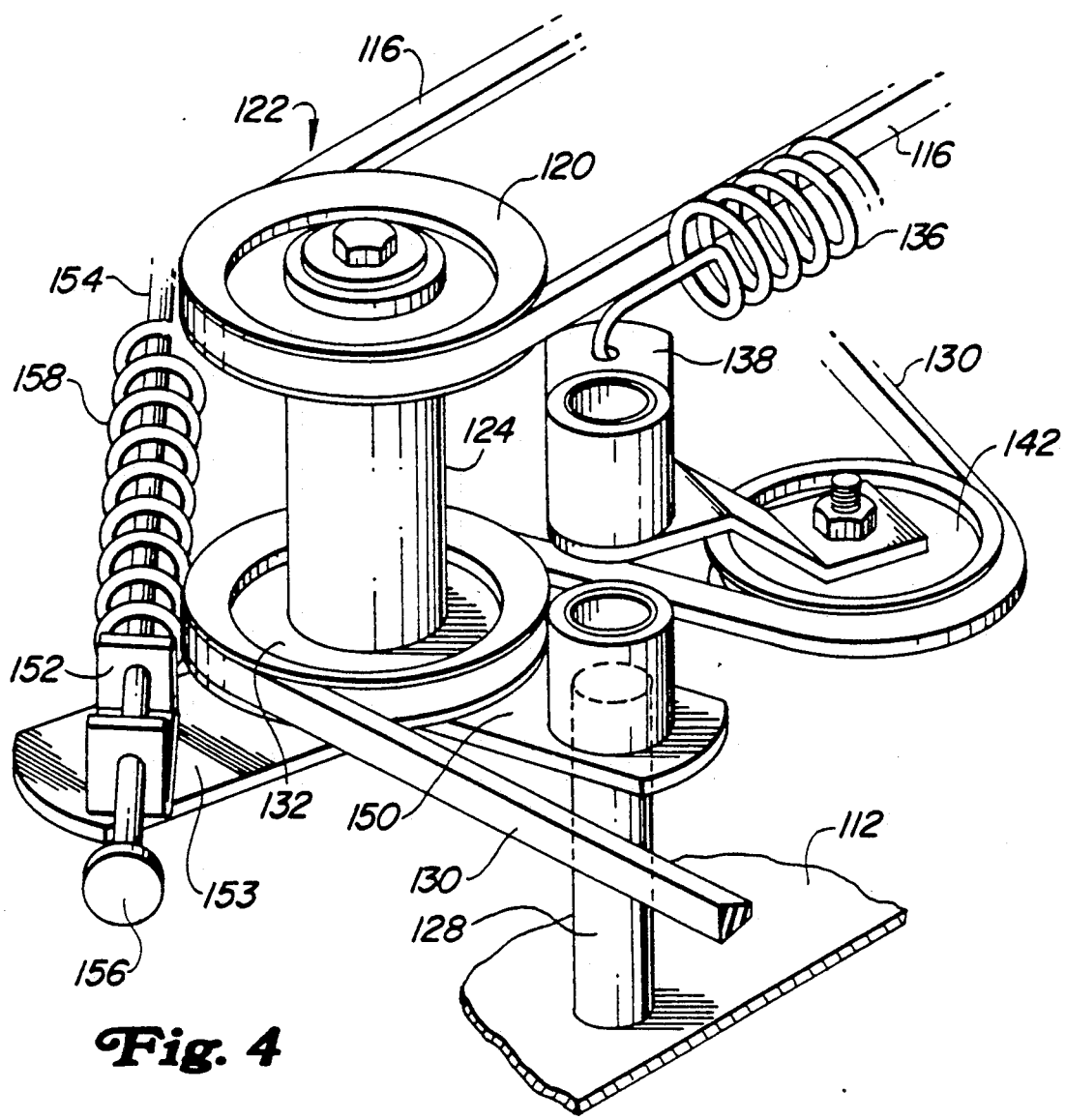
FIG. 4 shows a partially exploded isometric view of the double pulley jacksheave of the present invention.
Figure 2:
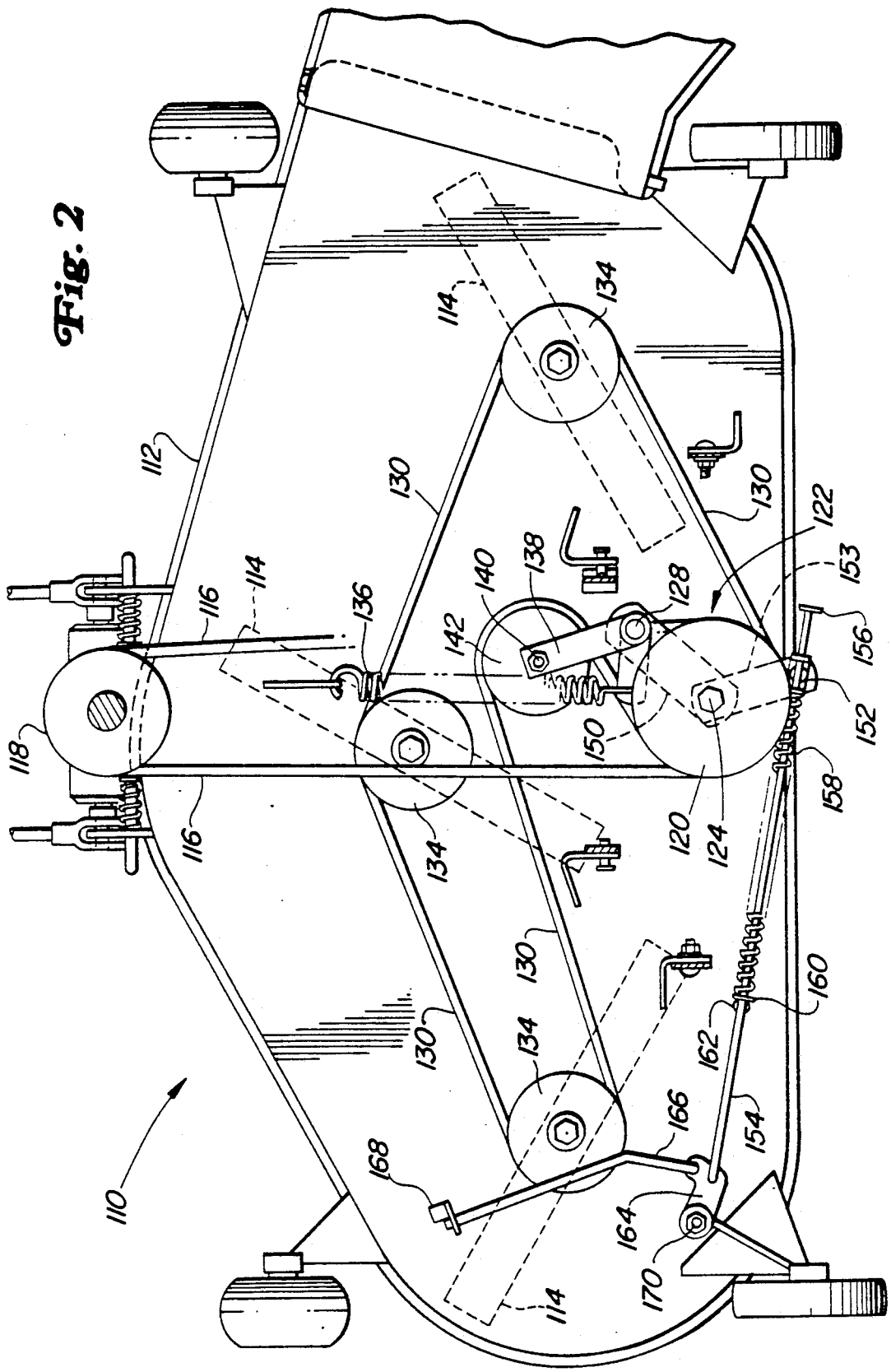
FIG. 2 shows a top view of the present invention with the primary belt tensioning mechanism actuated.

Next, the preferred embodiment will be described in detail. Referring now to FIGS. 1, 2, 3, and 4, there is shown the preferred embodiment of the present invention 110. A mower deck 112 within which blades 114 rotate to cut vegetation is carried by a powered vehicle 115 such as a lawn tractor, as shown in FIG. 1. A mechanism is provided for transmitting power from the power source to the mower deck 112, as shown in FIG. 2. An endless primary belt 116 couples a drive pulley or power source output sheave 118 with a driven pulley or primary pulley 120 of a double pulley jacksheave 122, better shown in FIG. 4. The primary pulley 120 is fixed for rotation with a tube or shaft 124. The shaft 124 is in turn carried by a first leVer means or primary arm 150 which is mounted for swinging movement about a pivot shaft or support axis 128. The pivot shaft 128 is supported by the deck 112.

The preferred embodiment provides a mechanism mounted to the deck 112 that acts to transfer power from the primary belt 116 to the blades 114 within the deck 112. A secondary pulley 132 of the double pulley jacksheave 122 is mounted for rotation with the shaft 124 and engages a secondary belt 130. The secondary belt 130 is entrained on a plurality of other pulleys 134 that are coupled with the mower blades 114.

Referring now to FIG. 2, there is shown a mechanism provided for tensioning the secondary belt 130 and that includes a secondary spring 136 coupled between the deck 112 and a second lever means or secondary arm 138. The secondary arm 138 is swingably supported by the pivot shaft 128 and carries a secondary tensioning pulley 142. The spring 136 acts to force the tensioning pulley 142 into the secondary belt 130 to tension the secondary belt 130 and maintain the belt's driving engagement with the mower blade pulleys 134.

The preferred embodiment also provides a mechanism for tensioning and untensioning the primary belt 116. The mechanism includes a U-shaped member or first abutment 152 swingably carried by a lever member 153. The lever member 153 is rigidly coupled with the primary arm 150 for pivoting about the pivot shaft 128. A rod-like member 154 is coupled with the U-shaped member 152 to form a lost motion connection and carries a first washer 156 fixed at one end via a cotter key. A compression spring 158 is carried by the rod 154 in compression between a second washer or abutment 160 and the U-shaped member 152. The second washer 160 abuts an upset portion 162 of the rod 154. The rod 154 is pivotably fixed to a crank member 164 that is swingably carried by the deck 112. A handle 166 is rigidly fixed to the crank member 164 and maintains an extreme clockwise orientation by engagement with a hook bracket 168 fixed to the deck 112.

Next, the operation of the preferred embodiment will be explained. During operation of the mower the primary belt tensioning mechanism is in its first mode and both belts 116, 130 are under tension, as shown in FIG. 2. The secondary belt 130 is under tension as described above. The handle 166 is held by the hook bracket 168 during operation to place tension in the primary belt 116. With the handle 166 in this position, the crank member 164 is in its extreme clockwise mode such that the rod 154 is pushed rightwardly. The second washer 160 is thereby pushed into the spring 158, which in turn presses against the U-shaped member 152. This causes the lever member 153 and primary arm 150 to swing counterclockwise about the pivot shaft 128, thereby shifting the primary pulley 120 rearwardly into the primary belt 116. The primary belt 116 is thereby put under tension.

During mowing operations the mower deck 112 may encounter ground conditions or other obstructions. The operator may attempt to lift the mower deck 112 to avoid gouging the ground or striking the obstruction. When approaching such an obstacle the operator of the present invention can grab the handle 166 to lift that portion of the mower deck 112. The inclusion of the handle 166 within the tensioning mechanism eliminates the need for welding or otherwise attaching a handle to the deck 112.

Between periods of operation the operator may wish to remove the primary belt 116 in order to replace the belt 116 or remove the deck 112 from the vehicle. The tension in the primary belt 116 must be released to remove the primary belt 116 from the primary pulley 120. To do this, the operator unlatches the handle 166 from the hook bracket 168, thereby placing the primary belt tensioning mechanism in its second mode. The tension in the primary belt 116 then forces the primary pulley 120 to shift forwardly. This causes the lever member 153 and primary arm 150 to swing clockwise and push the spring 158 to the left via the U-shaped member 152. The rod 154 is thereby pushed to the left and causes the crank member 164 and handle 166 to swing counterclockwise to an intermediate position. Meanwhile, the tension applied to the secondary belt 130 by the second spring 136 and tensioner pulley 142 continue to urge the secondary jacksheave pulley 132 in a counterclockwise direction about the pivot shaft 128. However, the geometry of the pivot shaft 128, the primary pulley 120 and the forces acting on the primary pulley 120 by the secondary belt 130 serve to urge the jacksheave in a counterclockwise and rearwardly direction, so that the primary belt 116 is not completely loosened on the pulley 132. Thus, the primary belt 116 is tensioned even when the handle 166 is unlatched. In the present invention, the operator overcomes this tensioning of the primary belt 116 by grabbing the handle 166 and turning it further counterclockwise, as shown in FIG. 3. The primary belt tensioning mechanism is thereby shifted to its third mode. As the handle 166 is turned counterclockwise, the rod 154 shifts to the left as illustrated in FIG. 3. This forces the first washer 156 against the U-shaped member 152, which causes the lever member 153, primary arm 150 and primary pulley 120 to swing forwardly and clockwise away from the primary belt 116 to a third position. The primary belt 116 therefore becomes untensioned.

When the handle 166 is in its extreme counterclockwise position, the rod 154 is close to or directly above the point 170 about which the crank member pivots on the deck, as shown in FIG. 3. This "over center" feature of the present invention allows the handle 166 to be maintained in its extreme counterclockwise position with little or no force of the operator's hand. The belt removal operation is thereby made easier.

When the operator wishes to again tension the primary belt 116 he turns the handle 166 clockwise to latch it within the hook bracket 168. As he begins to turn the handle 166 clockwise the spring 158 is already partially compressed or preloaded between the second washer 160 and the U-shaped member 152. The compression spring 158 therefore already contains an initial amount of internally stored energy. The operator must compress the spring 158 to a point corresponding with a desired amount of stored energy for operation by applying a force to the handle 166. Since the spring 158 is already partially compressed or pre-loaded, the amount of work required to place the primary belt 116 under the desired operating tension is reduced. Prior art tension springs contain a smaller amount of pre-load or stored energy when released than do compression springs partially compressed. The preloading of the spring 158 of the present invention therefore reduces the amount of work the operator does when tensioning the belt 116.

The preferred embodiment of the present invention is described above as adapted for use with a mower having two belts 116, 130. However, the present invention may be utilized on a mower having only one belt.

The present invention therefore provides a mowing device that applies tension to a belt 116 for transferring power from the power source to the mower blades 114. The tensioning mechanism is also adapted to allow the operator to positively remove tension from the belt 116 by turning a handle 166. The configuration of the handle 166 allows the operator to keep the handle 166 in a nontensioning position with little or no effort. Preloading of the primary belt tensioner spring 158 reduces the amount of work the operator must do to retension the belt 116. The handle 166 can also be grabbed by the operator during mowing operations to lift a portion of the deck 112 in order to prevent the deck 112 from striking obstructions or gouging irregular ground conditions.

I claim:
1. An improved vegetation mower usable with a vehicle having a power source, said mower including:
   a deck carried by the vehicle;
   blades carried by the deck for cutting vegetation;
   a primary belt driven by the power source;
   a shiftable primary pulley that engages the primary belt;
   means for biasing the primary pulley to shift into engagement with the primary belt;
   a secondary drive means coupling the primary belt with the blades; and
   means for selectively shifting the primary pulley by exerting force on the primary pulley, said means being positionable in a first mode wherein the shifting means biases the primary pulley into the primary belt to tension the primary belt, a second released mode wherein the shifting means exerts no force on the primary pulley, and a third mode wherein the shifting means exerts a force on the primary pulley in a direction away from engagement with the primary belt to shift the primary pulley away from the second mode and away from engagement with the primary belt, such that the force applied by the biasing means is overcome.

2. The invention as defined in claim 1, wherein the secondary drive means includes a secondary belt entrained about secondary pulleys and a secondary tensioning means is provided to urge the secondary belt into engagement with said pulleys.

3. The invention as defined in claim 2, wherein the secondary tensioning means acts to urge the primary pulley into engagement with the primary belt.

4. The invention as defined in claim 2, wherein:
   one of the secondary pulleys is fixed for rotation with the primary pulley to form a double pulley jacksheave;
   a pivot shaft is carried by the deck;
   an arm is pivotally supported by the pivot shaft, said arm rotatably supporting the jacksheave, and
   said pivot shaft is positioned such that the secondary belt's tightened engagement with the jacksheave's secondary pulley biases the arm to pivot about the pivot shaft in a first arcuate direction, said primary pulley being shifted into engagement with the primary belt when shifted in the first arcuate direction.

5. The invention of claim 4, wherein the secondary belt engages the secondary pulley of the jacksheave to form first and second runs of said belt that extend outwardly from the secondary pulley, said runs forming an angle that defines a line of bisection therebetween,
   the tension in the first run acts to bias the jacksheave to swing in the first arcuate direction, and
   the pivot shaft is positioned between the runs and on the same side of the line of bisection that the second run is on, such that the force resulting from the tension in the secondary belt acts to bias the primary pulley in the first direction to tension the primary belt.

6. The invention of claim 5, wherein the shifting means further comprises:
a rod-like member coupled to the arm for applying a force on the arm in a second arcuate direction about the pivot shaft to disengage the primary pulley from the primary belt, said second arcuate direction being opposite that of the first arcuate direction.

7. The invention as defined in claim 1, and further comprising means for maintaining the shifting means in its first position.

8. The invention as defined in claim 7, wherein the shifting means further comprises a compression spring for shifting the primary pulley into the primary belt.

9. The invention as defined in claim 8, and further comprising means for maintaining the compression spring partially compressed when the shifting means is in either of its three modes.

10. The invention as defined in claim 8, wherein the shifting means further comprises a rod-like member coupled to the primary pulley for shifting the primary pulley between the first, second and third modes.

11. The invention as defined in claim 10, and further comprising a handle coupled with the rod-like member for causing the shifting means to shift between its first, second, and third modes.

12. The invention as defined in claim 11, and further comprising means for securing the handle to the deck when the shifting means is in the first mode, said handle being adapted for being grabbed by an operator's hand to lift a portion of the mower deck.

13. The invention as defined in claim 11, wherein the secondary drive means further comprises a secondary belt and a plurality of secondary pulleys for coupling the primary belt with the blades.

14. The invention as defined in claim 13, and further comprising:
means for tensioning the secondary belt;
a shiftable shaft fixed for rotation with the primary pulley and one of the secondary pulleys.

15. The invention as defined in claim 4, wherein the shifting means further comprises:
a pivotable arm that carries the primary pulley between the first, second and third modes;
a rod-like member coupled to the pivotable arm for pulling the primary pulley from the second to the third mode; and
a compression spring mounted on the rod-like member for pushing the primary pulley from the third to the second and first modes.

16. The invention as defined in claim 15, wherein the secondary drive means includes a secondary belt entrained about secondary pulleys and a secondary tensioning means is provided to urge the secondary belt into engagement with said pulleys.

17. The invention as defined in claim 16, wherein the secondary tensioning means further acts to urge the primary pulley into engagement with the primary belt.

18. The invention as defined in claim 15 and further comprising means for maintaining the compression spring partially compressed when the shifting means is in either of the three modes.

19. The invention as defined in claim 18 wherein the compression maintaining means further comprises:
a washer fixed to the rod-like member and in abutment with the compression spring;
a U-shaped member coupled with the rod-like member and the primary pulley, said U-shaped portion being in abutment with the end of the spring opposite the washer.

20. The invention as defined in claim 19, wherein the secondary drive means further comprises a secondary belt and a plurality of secondary pulleys for coupling the primary belt with the blades.

21. The invention as defined in claim 20, and further comprising:
means for tensioning the secondary belt;
a shiftable shaft fixed for rotation with the primary pulley and one of the secondary pulleys.

22. An improved belt tensioning means usable with an implement carried by a vehicle having a power source and a drive pulley, said implement having a driven pulley mounted for swinging movement about a support axis offset from the center of rotation of said driven pulley, and an endless belt trained around the drive and driven pulleys, the improvement comprising:
means for biasing the driven pulley into driving engagement with the endless belt;
first lever means coupled with the driven pulley and shiftable between first, second and third positions, the first lever means acting to force the driven pulley toward engagement with the endless belt to tension the endless belt when in the first position, said first lever means acting to exert no force on the driven pulley when in the second position, and said first lever acting to exert a force on the driven pulley in a direction away from engagement with the endless belt when in the third position;
second lever means carried by the implement and offset from the driven pulley, said second lever means being shiftable between first, second and third positions; and
a tensioning member coupled to and extending between the first and second lever means, said tensioning member including a compression spring operative to urge the first lever means toward its first position when the second lever means is in its first position and a lost motion connection between the spring and the first lever means, whereby movement of the second lever means to its third position shifts the tensioning member and the first lever means to its third position.

23. The invention defined in claim 22, wherein the tensioning means includes an elongated rod coaxially surrounded by a spring carried between first and second abutments, said abutments being carried respectively on the first lever means and the rod.

24. The invention defined in claim 23, wherein the first abutment is adapted to receive the rod for sliding movement therethrough.

25. The invention defined in claim 22, wherein a handle is coupled with the second lever means, said handle being shiftable between a first latched position wherein the tensioning means urges the first lever means toward its first position and a second unlatched position wherein the first lever means is moved toward its second position, and a third unlatched position wherein the first lever means is urged toward its third position.

26. The invention defined in claim 22, wherein the driven pulley is moved in a first direction about its support axis as the first lever means is moved from its second to its first position, and is moved in a reverse direction about its support axis as the first lever means is moved from its second position to its third position.

27. The invention defined in claim 22 wherein the second lever means is pivotally supported by the implement and coupled with the tensioning means such that said coupling is moved from one side of said pivotal support to the other side of said pivotal support as the second lever means is moved between its first and third positions.

28. A tensioning mechanism as used with a vegetation cutting implement driven by a vehicle, said vehicle having a power source and primary belt driven by the power source, said implement having a primary pulley swingably carried by an arm pivotable about a pivot shaft offset from the axis of rotation of the primary pulley, said pulley being shiftable in a first arcuate direction about the pivot shaft to drivingly engage the primary belt, a secondary pulley fixed for rotation with the primary pulley and drivingly engaged by a secondary belt that is entrained about cutting means pulleys and a tensioning pulley such that tension in the secondary belt biases the secondary pulley and primary pulley fixed therewith to swing about the pivot shaft in the first direction and toward engagement of the primary pulley with the primary belt, comprising:

a tensioning mechanism coupled with the arm and being shiftable to first, second and third modes, wherein said mechanism biases the primary pulley to swing in the first direction about the pivot shaft to drivingly engage the primary belt when the tensioning mechanism is in the first mode, said mechanism applies no force to the arm and primary pulley when in the second mode, and said mechanism exerts a force on the arm in a second arcuate direction opposite the first direction to swing the primary pulley about the pivot shaft and away from driving engagement with the primary pulley when the tensioning mechanism is in the third mode, said force exerted in the third mode being sufficient to overcome the biasing of the primary pulley in the first direction caused by tension in the secondary belt, said tensioning mechanism further comprising:

a rod member operatively and slidably coupled with the arm member, said rod having a first abutment for engaging the arm to shift the arm and the primary pulley in the second arcuate direction when the tensioning mechanism is in the third mode;

a spring positioned coaxial with the rod for biasing the arm in the first arcuate direction when the tensioning mechanism is in the first mode.

29. A mechanism for use in the combination of a vehicle with an implement carried by and powered by said vehicle, wherein the vehicle has a power source and a primary belt coupled with the power source, and the implement includes implement pulleys rotated by an endless secondary belt, said primary and secondary belts being entrained about respective primary and secondary pulleys carried on a common shaft which in turn is carried on an arm supported by a pivot means spaced from said shaft, means for tensioning the secondary belt, the secondary belt being at least partially wrapped around the secondary pulley, and forming first and second runs of the belt that extend out from the secondary pulley, said runs extending at an angle to each other and defining a line of bisection therebetween, whereby the tension in said first run acts to bias the secondary pulley and the primary pulley therefixed to swing in a first direction about the pivot means, said first direction being the direction in which the primary pulley swings to drivingly engage the primary belt, said pivot means being positioned between the two runs and on the same side of the line of bisection as the second run, such that the force resulting from the tension in the secondary belt acts to bias the primary pulley in the first direction to tension the primary belt, the improvement comprising a mechanism for swinging the shaft about the pivot means and between a mode whereat the primary belt is untensioned and a mode whereat the primary belt is supplementally tensioned, comprising:

a lever arm carried by the shaft and movable therewith;

rod means slidably carried by the arm;

biasing means carried by the rod urging the arm and shaft to swing about the pivot means and move the primary belt toward its supplementary tensioned mode; and bell crank means coupled with the rod means movable to overcome the biasing means and swing the shaft about the pivot means to overcome the pretension on said primary belt.

* * * * *